United States Patent [19]

Kerr

[11] 4,238,537
[45] Dec. 9, 1980

[54] PROCESS FOR ROTATIONAL MOLDING UTILIZING EVA AND PRODUCTS PRODUCED THEREFROM

[75] Inventor: Douglas S. Kerr, Ashland, Ohio

[73] Assignee: The National Latex Products Company, Ashland, Ohio

[21] Appl. No.: 970,391

[22] Filed: Dec. 18, 1978

[51] Int. Cl.² .................. A63B 39/02; B28B 1/46
[52] U.S. Cl. .................... 428/35; 264/310; 264/312; 273/60 B; 273/61 C; 273/58 J; 273/DIG. 4; 273/DIG. 5
[58] Field of Search .............. 273/58 B, 58 J, 58 R, 273/61 C, 60 B, DIG. 4, DIG. 5; 264/310, 311, 312; 428/35

[56] References Cited
U.S. PATENT DOCUMENTS

| | | | |
|---|---|---|---|
| 3,246,069 | 4/1966 | Maynord | 264/310 |
| 3,253,068 | 5/1966 | Whittington | 264/246 |
| 3,432,165 | 3/1969 | Haines et al. | 273/61 C |
| 3,788,792 | 1/1974 | Suzuki | 264/310 |
| 3,914,361 | 10/1975 | Shiina et al. | 264/310 |
| 4,169,594 | 10/1979 | Crane | 428/35 |

*Primary Examiner*—William R. Dixon, Jr.
*Attorney, Agent, or Firm*—Baldwin, Egan, Walling & Fetzer

[57] ABSTRACT

A rotationally molded hollow article and a process for molding such an article, wherein the article is formed of a mixture of plastic pellets and powder both of which are copolymers of ethylene and vinyl acetate, having a predetermined range of pellet to powder mixture ratio, and with such mixture having a predetermined melt index range, the article being characterized by having substantial "bounce" characteristics generally equivalent to those possessed by hollow, non-cellular articles made of known thermoplastic compositions or known rubber-like compositions of natural and/or synthetic polymers, as well as those possessed by solid cellular articles made from other known thermoplastics or from known rubber-like compositions of natural or synthetic polymers.

22 Claims, 6 Drawing Figures

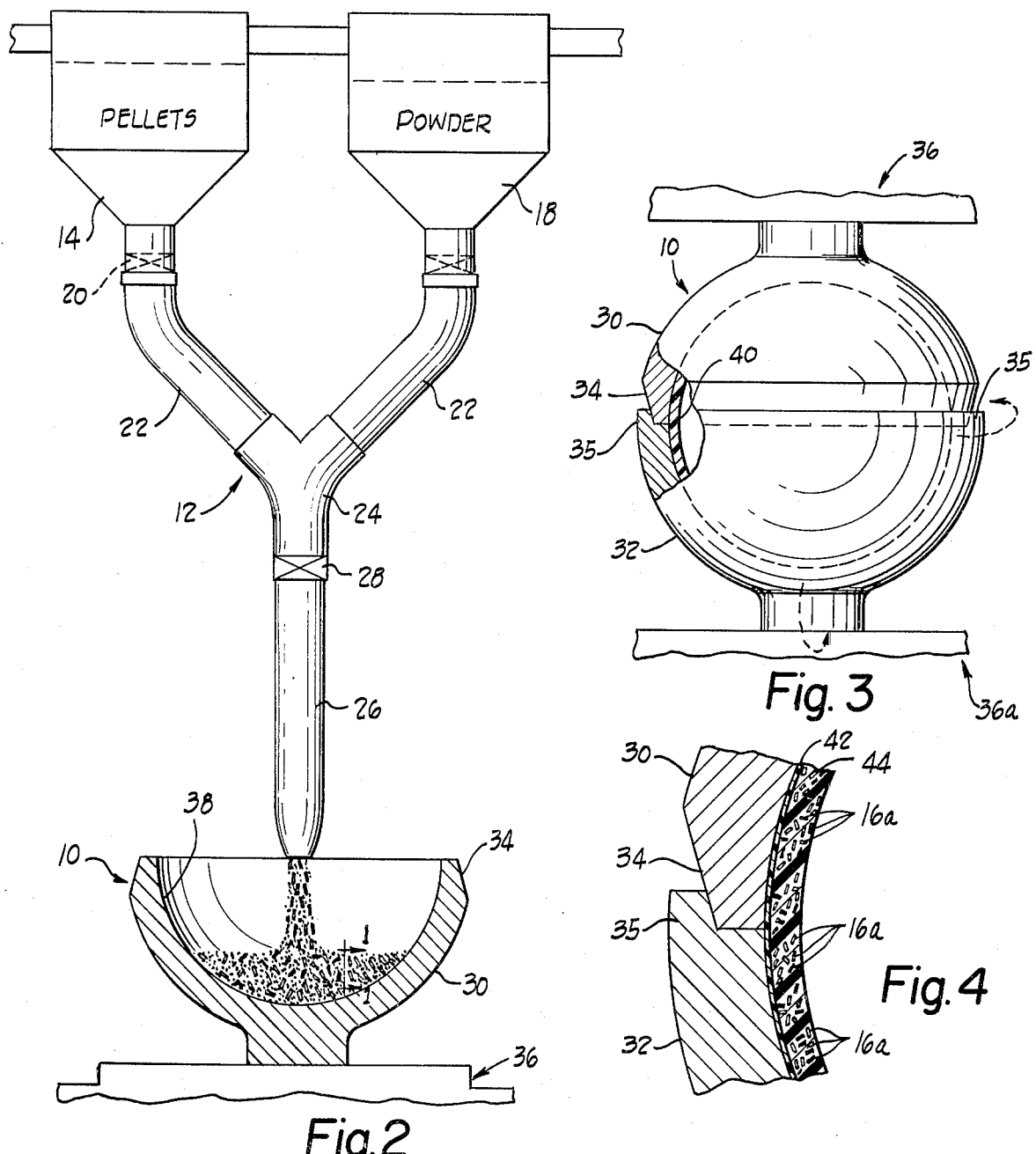

PROCESS FOR ROTATIONAL MOLDING UTILIZING EVA AND PRODUCTS PRODUCED THEREFROM

This invention relates to a rotationally molded, hollow article, such as a playball or sports ball, formed from thermo-plastic material, and more particularly to a rotationally molded hollow article formed from a mixture of plastic pellets and powder both of which are copolymers of ethyelene and vinyl acetate, and the process for producing the same.

BACKGROUND OF THE INVENTION

Rotational molding and casting techniques are quite highly developed and are well known in the molding and casting art. The rotational molding of the synthetic resins in powdered form is likewise well known. It is also known in the prior art to rotationally mold articles utilizing a mixture of thermoplastic powder and thermoplastic pellets, such as for instance a mixture of polyethylene pellets and powder, to provide rotationally molded, hollow articles such as containers, Christmas tree ornaments and other decorative objects other than playballs or sport balls. U.S. Pat. Nos. 3,293,344, 3,368,013, 3,474,165, 3,514,508, 3,564,656, 3,788,792 and 3,914,361 disclose various processes and/or apparatus for rotational molding of thermoplastic hollow articles.

However, to applicant's knowledge, no one heretofore has thought of utilizing a mixture of plastic pellets and powder, both of which are copolymers of ethylene and vinyl acetate and, having a predetermined range of powder to pellet ratio and a predetermined melt index, for producing a thermoplastic rotationally molded hollow article which possessed good to excellent "bounce" characteristics substantially independent of air pressure interiorly of the article.

The synthetic thermoplastic material most commonly used for producing hollow articles such as playballs by the rotational casting process is vinyl plastisol. Such vinyl playballs have relatively poor "bounce" characteristics unless they are internally pressurized, as for instance with air. Since most thermoplastics are at least slightly permeable to air, and such pressurized articles or balls may leak air pressure at their closure plugs or valves, such playballs made by such prior art methods gradually lose their internal air pressure, becoming progressively more flabby and shrinking, resulting in poor "bounce". The average useful life of such inflated thermoplastic playballs is not much longer than one year from the date of manufacture.

Likewise, hollow molded articles such as playballs or sport balls made from rubber-like compositions of natural and/or synthetic polymers (e.g. conventional tennis balls) depend on internal air pressure for their required "bounce" characteristics and rapidly become unfit for use unless equipped with a valve for re-inflation.

Another type of small playballs used by children is made from solid cellular thermoplastics or from rubber-like compositions of natural and/or synthetic polymers (e.g. sponge rubber). Such solid cellular balls possess relatively good "bounce" characteristics but are heavier than desired for indoor use by children and have unattractive and easily abraided surface textures.

SUMMARY OF THE INVENTION

The present invention provides a novel, rotationally molded hollow article formed from a rotational molding process and wherein the article comprises a mixture of plastic pellets and powder both of which are copolymers of ethylene and vinyl acetate having a melt index within the range of approximately 10 to 50 and a pellet to powder mixture ratio within the range by weight of approximately 50% to 80% pellets to approximately 50% to 20% powder, with the article being characterized by having substantial "bounce" characteristics generally equivalent to those possessed by (a) hollow articles with non-cellular walls made from other thermoplastics, (b) hollow articles with non-cellular walls made from rubber-like compositions of natural and/or synthetic polymers, and/or (c) solid cellular articles made from other thermoplastics or from rubber-like compositions of natural and/or synthetic polymers; and with the "bounce" of the present article being substantially independent of internal air pressure, within the article.

Accordingly, an object of the invention is to provide a novel rotationally molded hollow article formed from a synthetic thermoplastic pellet-powder mixture.

Another object of the invention is to provide an article of the above described type which is formed from a mixture of plastic pellets and powder, both of which are copolymers of ethylene and vinyl acetate.

A still further object of the invention is to provide an article of the aforementioned type which has a pellet to powder mixture ratio within the range by weight of approximately 50% to 80% pellets and approximately 50% to 20% powder, and having a melt index within the range of approximately 10 to 50, with the article being characterized by having good to excellent bounce characteristics.

A still further object of the invention is to provide a novel process for the production of a rotationally molded hollow plastic article such as a playball utilizing a thermoplastic mixture of ethylene-vinyl acetate pellets and powder introduced into the mold of a molding apparatus and being within a range by weight of approximately 50% to 80% pellets and approximately 50% to 20% powder.

Other objects and advantages of the invention will be apparent from the following description taken in conjunction with the accompanying drawings wherein:

BRIEF DESCRIPTION OF THE DRAWINGS

FIG. 1 is a generally diagrammatic fragmentary, enlarged, sectional illustration of a generally uniform mixture of pellets and powder as inserted into a mold, showing the powder filling the interstices between the pellets, and is taken generally along line 1—1 of FIG. 2.

FIG. 2 is a diagrammatic illustration of a supply system for uniformly mixing the pellets and powder prior to its being inserted into a mold.

FIG. 3 is a partially broken, elevational view of one of the sectional molds of a machine utilizable in practicing the process, with the closed mold having been rotated to an inverted position as compared to the position illustrated in FIG. 2, and illustrating a molded playball.

FIG. 4 is an enlarged, fragmentary illustration of a section of the FIG. 3 mold and of another embodiment of hollow molded playball article produced, in the rotational molding process.

FIG. 5 is a complete view of a finished article produced in accordance with the invention, and more particularly a playball.

FIG. 6 is a section of the wall of the article of FIG. 5 taken generally along the plane of line 6—6 of FIG. 5, looking in the direction of the arrows.

DESCRIPTION OF PREFERRED EMBODIMENTS

Referring now again to the drawings, there is illustrated in FIG. 1 a mixture of the plastic pellets and powder which is charged into a mold 10, from a supply system 12.

Supply system 12 (FIG. 2) in the embodiment illustrated, comprises a hopper 14 for receiving therein a supply of the synthetic plastic pellets 16 (FIG. 1) and a hopper 18 adapted for receiving therein a supply of the synthetic thermoplastic powder 17. Hoppers 14 and 18 may be of the type illustrated in Whittington U.S. Pat. No. 3,253,068, issued May 24, 1966, and which embody a valving control system for selectively controlling the discharge of predetermined quantities of material from each of the hoppers 14 and 18. Reference may be had to such patent for a detailed description of the operation of such hopper mechanism. Each of the hoppers preferably has control valving mechanism 20 interiorly thereof for controlling the emission of the respective material from the respective hopper and as disclosed in the aforementioned Whittington patent.

The pellet material from hopper 14 and the powder material from hopper 18 travel by gravity down their respective exit chute 22 to Y section 24, where the pellets and powder mix together, and then such mixture may pass via preferably flexible feeder tube 26 into the lower section of mold 10. A valve 28 may also be provided, coacting with the feeder tube 26 for selectively controlling the emission of the generally uniformly mixed mixture of pellets and powder from the feeder tube.

The pellets 16 and the powder 17 (FIG. 1) in accordance with the invention are copolymers of ethylene and vinyl acetate, known as EVA, with the pellet-powder mixture ratio being within the range by weight of approximately 50% to 80% pellets, to approximately 50% to 20% powder, and with such EVA mixture having a melt index within the range of approximately 10 to 50. The term "melt index" as used herein will be hereinafter defined.

The molds customarily may be made of machined or cast aluminum, and for the production of spherical articles, such as playballs, the mold cavities are made in two coacting hemispheres 30 and 32 (FIG. 3), the lower hemisphere 30 (FIG. 2) of the playball mold is provided with a tapered male portion 34 adjacent the parting line, and the upper hemisphere 32 of the mold is provided with an overlapping female portion 35 (FIG. 3) to assist in retaining the material in the mold without leaking, prior to solidification of the material. As will be understood, the mold illustrated in FIG. 3 has been rotated 180° in a vertical plane from starting position, so that the lower section 30 of the mold is oriented in top position while the upper section 32 of the mold is in bottom position.

The molds are preferably interiorly coated so as to prevent synthetic thermoplastic material inserted into the mold cavity from adhering to the metal of the mold during the molding process. This coating can be a permanent coating such as, for instance, "Teflon" (polytetrafluoroethylene) or a temporary sprayed on anti-stick coating, (many of which are known in the art) and which must be renewed from time to time.

Although the process can be performed with a single cavity mold mounted on a simple mounting fixture, for limited production of small articles, such as for instance playballs, tennis balls, hand balls and the like, in actual production many mold cavities are preferably provided, conventionally mounted on a conventional grid-like metal structure 36 or 36a diagrammatically illustrated in the drawings, and called a spider. The spider 36 may be mounted to a rotational machine arm of a conventional rotational casting machine and carries the lower hermispherical mold sections 30 of the mold cavities. An upper spider 36a hinged or otherwise removable from the lower spider, carries the upper sections 32 of the hemispherical mold cavities. Two spiders with the mold sections mounted thereon, and the conventional bolts to secure the two spiders together comprise a complete openable and closeable mold structure, and as is known in the rotational molding art. Such type of mold structure is conventionally utilized for the production of synthetic thermoplastic playballs formed for instance of polyvinyl chloride plastisol.

The pellet material 16 is generally formed from extruded strands which may be of almost any configuration in cross section (e.g. square, circular, ovate, etc.) in shape, and in the embodiment illustrated are shown as being generally circular in cross section. The extruded plastic strands are cut into relatively short pellet lengths, as for instance, approximately $\frac{1}{8}$ inch long, and as an example, the diameter of the pellets may also be in the order of $\frac{1}{8}$ inch. As an example, initial weight of the pellets may be of the order of 0.55 grams per cubic centimeter. Of course, other sizes, weights and configurations of pellets may be used to satisfactorly practice the invention, as well as combinations of various sizes, weights and configurations of pellets.

The EVA powder 17 is within a range of approximately 20 to 50 mesh, and may have an initial weight for instance, of approximately 0.328 grams per cubic centimeter in powder form.

The mixture ratio of pellets and powder inserted into the mold is preferably so arranged such that the amount of powder in the mixture is just substantially sufficient to fill the voids between the pellets, resulting in a volume of pellet and powder mixture which is substantially the same as the volume of the pellets prior to adding the powder.

The process of the invention may be performed as follows:

Starting with an empty open mold, a charge of predetermined weight or volume of a mixture of the EVA pellets and powder is introduced into the bottom half 30 of each cavity 38 of the mold assembly, and as illustrated in FIG. 2. This introduced mixture amount is preferably within approximately two-thirds full to completely full of the volume of lower section 30 of the mold cavity. The upper spider 36a of the mold arrangement is then lowered until the mating edges of the mold cavities meet and the conventional clamping bolts (not shown) on the spiders are tightened.

The mold is then indexed or moved into an oven in the conventional manner, with the oven most commonly being heated with hot air, circulated at a relatively high velocity. The rotational molding machine on which the molds 10 and spiders 36, 36a are conventionally mounted may be equipped with one or more arms consisting of an outer horizontal shaft which rotates the spiders and associated molds about a horizontal axis, and a gear coupled vertical shaft to which the molds are attached, which simultaneously rotates the spiders and associated molds about a vertical axis, and as is conventional in the molding art. The resultant compound motion of rotation about two axes (as illustrated by the phantom line arrows in FIG. 3) exposes all interior portions of the mold cavities to the charge of pellets and powder, which remains in the bottom of the lower cavity until it melts sufficiently to adhere to the mold cavity walls.

Rotation and heating of the molds are continued until all of the pellets and powder have melted into a generally homogeneous mass and formed a generally uniform layer of melted EVA plastic (e.g. 40) against the interior mold surface of the cavity walls. At this time the mold is indexed or otherwise removed from the oven section of the molding apparatus to a cooling section.

Cooling can be accomplished for instance by spraying or pouring water onto the rotating molds and/or by circulating cold air over the molds. Depending in part on the melt index of the meterial used, cooling must be maintained until the article possesses sufficient strength to resist deformation that tends to occur upon opening of the molds and removing the formed articles.

The completely cooled molds may then be indexed or otherwise removed from the cooling section of the apparatus and placed at a working station position, where the molds can be opened upon loosening of the aforementioned bolts, and the formed articles A (FIG. 5) removed. An air blast can be utilized to remove any liquid water remaining on the molds from the cooling step.

For machines, molds and materials used by the inventor for making ball products of the tennis, racket or hand ball general size type, by the process herein disclosed, suitable conditions ranged from about 6 to 7 minutes in the heating section in a high velocity air heated oven of a conventional rotational molding apparatus, maintained in the range of about 500° F. to about 625° F. The higher the temperature of the oven chamber and/or the longer the mold is permitted to remain at the elevated temperature, the more the pellets and powder melt together. At the aforementioned exterior temperature of about 500° F. to 625° F. in the heating oven within the time range specified, the interior temperature of the mold is about 400° F. to about 525° F.

Cooling was commenced with a cold water spray followed by air cooling from fans, the ratio of time for each cooling media being set to reduce the mold temperature to about 70° F. to about 85° F. when it has left the cooling section.

It will be understood however that exact heating, or cooling times and temperatures depend primarily on the range of materials, products and types of production machinery that are used according to the process. Variables such as melt index of the powders and pellets, mold cavity material and thickness, temperature and velocity of heating and cooling media all contribute to the time each mold must remain in the heating and cooling sections. It is relatively easy to find the correct time and temperture for properly heating and cooling molds on any type of rotational molding apparatus. Results observed during a few experimental cycles in which the various parameters are altered will show when the blend of pellets and powders provided in accordance with this invention has melted into a homogenous layer as shown in FIG. 3, with no signs of degradation of voids in the article. Cooling conditions can easily be adjusted to permit the formed articles to be removed from the mold cavities without deformation.

Referring now to FIG. 4, there is illustrated another embodiment of ball article which may be produced in accordance with the invention, and wherein in the process, the heating time and temperature are adjusted so that the pellets and powder do not melt into a generally homogeneous layer, but instead the pellets are raised to a temperature resulting in only a semi-viscous state, so that the pellets and powder particles do not flow into a homogeneous layer during rotation of the mold. This results in the pellets not totally losing their individuality but instead at least in part retaining their particle characteristics, even though fused together into a generally uniform thickness of wall for the formed ball article. The partial retainment of particle configuration of the pellets results in a wall for the article formed by a generally thin substantially uniform thickness layer 42 of homogeneous, non-particlized plastic fused to a relatively thicker layer 44 of particlized fused plastic. The homogeneous layer 42 on the formed article provides a glossy-like effect on the exterior of the article, with the partially melted and fused pellets 16a showing through to give considerable depth effect. This result is especially outstanding for generally translucent colors of formed articles. The "bounce" characteristics of these "particlized" wall balls are generally similar to the "bounce" characteristics of the homogenous wall balls of FIGS. 3, 5 and 6.

Molding experiments have been perfomed by applicant utilizing EVA powder only, in the manufacture of playballs. It was found that the bottom half of a relatively small mold of the type used for instance in producing a tennis ball size of playball, could not contain enough material which, when melted and solidified, would form a wall thickness of sufficient dimension to form a commercially saleable product. Powders of a wide range of vinyl acetate content and melt index number were found to produce the same poor results; and more particularly, the walls of the produced balls were so thin that they flattened against the surface contacted when bounced or thrown, and did not rebound.

With the present arrangement of a predetermined range mixture of EVA pellets and powder, the walls of the formed ball article can be maintained thick enough, and sufficient plastic stock material can be inserted into each mold, so that the article formed has a considerable "bounce," and a bounce generally equivalent to those possessed by (a) hollow articles with non-cellular walls made from other thermoplastic (such as for instance convetional rotationally cast vinyl balls, which constitute the major part of the toy playball industry, and which depend on internal air pressure for their "bounce") or (b) hollow articles with non-cellular walls made from rubber-like compositions of natural and/or synthetic polymers (such as for instance tennis balls or rubber handballs, which generally depend at least in part on internal air pressure for "bounce" characteristics) and/or (c) solid cellular articles made from other thermoplastics or rubber-like compositions of natural and/or synthetic polymers (such as for instance the known and popular sponge rubber playballs, which have air cells trapped within the body of the ball).

it has been found that the mixture of EVA pellets and powder, in order to perform satisfactorily, must have a melt index within the range of approximately 10 to 50. "Melt index" as used here is defined as the amount in grams of a thermoplastic resin, which can be forced through an orifice of 0.0825 inch diameter, when subjected to a force of approximately 2,160 grams in ten minutes at 190 degrees Centigrade. The "Melt Index" test may be performed by an extrusion rheometer described in ASTM D 1238-73 entitled "Standard Method of Measuring Flow Rates of Thermoplastics by Extrusion Plastometer." This test will give a suitable melt index identification value for use by commerical EVA suppliers.

Among a wide variety of grades of EVA, which would be suitable for use in the process, the following are cited as examples of especially satisfactory EVA materials.

A. UE-638 EVA Pellets made by U.S. Industrial Chemicals, having a melt index of 24, vinyl acetate content of 31%, and density of 0.960 grams per cubic centimeter in processed form.

B. No. 3180 EVA Pellets made by the Plastic Products & Resins Department of Du Pont, having a melt index of 25, vinyl acetate content of 28%, and density of 0.950 grams per cubic centimeter in processed form.

(At the time of this application, neither of the above are available in powder form from their manufacturers, and must be cryogenically ground by the processor).

C. MU-760 EVA Powder, made by U.S. Industrial Chemicals, having a melt index of 20, vinyl acetate content of 12%, and density (when processed and solidified) of 0.941 grams per cubic centimeter. The nominal particle size of this powder is 35 mesh, with a very narrow range of size distribution and few fines.

Among the large number of blends of the above three materials and/or other grades of EVA that would be suitable for the process, the following are cited as examples, with comments as to their relative costs and bounce characteristics:

1. 70% 3180 Pellet with 30% 3180 Powder. Has best bounce and highest cost.
2. 70% 3180 Pellet, 15% 3180 Powder, 15% MU-760 Powder. Has nearly the same bounce as (1) but is considerably cheaper.
3. 70% 3180 Pellet with 30% MU-760 Powder. Has nearly the same bounce as (2) but is considerably cheaper.
4. 70% UE-638 Pellet with 30% 3180 Powder. Has about the same excellent bounce as (1) with slight cost reduction.
5. 70% UE-638 Pellet, 15% MU-760 Powder, 15% 3180 Powder. Has same bounce as (2) with cost reduction.
6. 70% UE-638 Pellet with 30% MU-760 Powder. Cheapest formulation, bounce relatively poor but saleable.
7. 70% UE-638 Pellet with 30% UE 638 Powder. Identical to (4) in cost bounce.

Pigments and metallic flake (glitter) can be added to all of the above formulations. Such flakes or glitter are commonly referred to as sparkles, glitter, or spangles, but the type preferred for this process consists of aluminum-foil flakes approximately 1/40th of an inch square by 0.00045 inches thick. The aluminum flakes are preferably coated on both sides with an epoxy resin colored with heat resistant pigments. The "glitter" can be added to the EVA powder in a quantity resulting in approximately 1% of glitter or less by weight of the pellet-powder mixture.

Although it is possible to blend pellets and powders together in one container, it was found that when blending in larger production quantities, there is a generally settling out of the components, which may alter the percentage of each as the contents are dispensed into the molds, either by gravity or by means of vacuum hopper loaders, such as are conventionally used for extruders and injection molders. Accordingly, the dispensing system illustrated in FIG. 2 is preferred.

The aforementioned process is especially advantageous in the area of small playballs up to the size of tennis balls, hand balls, soft balls and the like. The ability to retain bounce indefinitely is especially valuable in tennis balls, which are normally sold in pressurized containers and have a short useful life after the associated container is opened. In ball articles produced by the present invention, slits or punctures can be made in the finished ball which results in substantially no effect on the "bounce" of the ball, or may even improve the bounce. This is because that during the rotational molding of the balls, excessively fast rates of heating can cause the air inside of the cavity to escape through the parting line gap between the mold sections, before the ball stock material melts enough to seal off this escape route. This may conventionally cause a dimple in the ball wall, due to a slight vacuum caused when the remaining air cools. When such "dimpled" EVA balls produced by the present process, are perforated so as to relieve the vacuum, the punctured ball may bounce higher than when dimpled. The articles or balls of the invention possess a commercial life that is unlimited. This is a valuable feature, not only for the ultimate consumer, but also to the wholesaler, retailer and manufacturer who are, of course, concerned with losses resulting from over-age of stock in inventory.

From the foregoing description and accompany drawings, it will be seen that the invention provides a rotationally molded hollow article, and a process for molding such an article, and wherein the article is formed of a mixture of pellets and powder, both of which are copolymers of ethylene and vinyl acetate, having a predetermined range of pellet to powder mixture ratio, with such mixture having a predetermined melt index range. The articles, such as playballs, are characterized by having substantial "bounce" characteristics, which "bounce" is substantially independent of internal air pressure within the ball.

The terms and expressions which have been used are used as terms of description, and not of limitation, and there is no intention in the use of such terms and expressions of excluding any equivalents of any of the features shown or described, or portions thereof, and it is recognized that various modifications are possible, within the scope of the invention claimed.

What is claimed is:

1. A rotationally molded, hollow article formed from a mixture of thermoplastic pellets and powder, both of which are copolymers of ethylene and vinyl acetate, having a melt index within the range of approximately 10 to 50 and a pellet to powder mixture ratio within the range by weight of approximately 50% to 80% pellets to approximately 50% to 20% powder, said article being characterized by having substantial bounce characteristics generally equivalent to those possessed by (a) hollow articles with non-cellular walls made from other thermoplastics, (b) hollow articles with non-cellular walls made from rubber-like compositions of natural and/or synthetic polymers, and/or (c) solid cellular articles made from other thermoplastics or rubber-like compositions of natural and/or synthetic polymers.

2. An article in accordance with claim 1 wherein said mixture of pellet and powder ratio is within the range of approximately 60% to 80% by weight of pellets and 40% to 20% by weight of powder.

3. An article in accordance with claim 2 wherein said powder is within a range of 20 to 50 mesh.

4. An article in accordance with claim 1 wherein said percentage of powder consists of approximately 30% to 70% by weight of an ethylene-vinyl acetate powder of high vinyl acetate content and which has been ground to powder size from pellets, and approximately 70% to 30% of a relatively low content vinyl acetate powder produced directly in powder form.

5. An article in accordance with claim 1 wherein said article is molded at a temperature which causes the mixture of pellets and powder to melt and blend together to form a generally homogenous layer against the interior wall of the mold cavity, for instance at a temperature of between approximately 500° F. to approximately 625° F.

6. An article in accordance with claim 1 wherein the article includes in the pellet-powder mixture approximately 1% or less by weight of metal flake material to provide a reflective type appearance to the article.

7. An article in accordance with claim 1 wherein the powdered polyethylene-vinyl acetate copolymer provides a glassy effect on the outside of the article, with the pellets being partially melted and showing through to give considerable depth effect.

8. An article in accordance with claim 1 wherein said mixture of pellet and powder ratio is such that the amount of powder is just substantially sufficient to fill all of the voids between the pellets, resulting in a volume of pellet and powder mixture which is substantially the same as the volume of the pellets prior to adding the powder.

9. An article in accordance with claim 1 which does not depend on internal air pressure or cellular structure for good bounce characteristics, and will maintain bounce characteristics as good as or better than the initial bounce as molded, even after being punctured with a sharp object.

10. In a rotational molding process wherein a plastic material is introduced into a mold and said mold is rotated simultaneously about two axes in the presence of heat followed by cooling whereby the plastic is melted and distributed against the walls of the mold to form a hollow, enclosed, molded article, the improvement comprising providing a mixture of plastic pellets and powder both of which are copolymers of ethylene and vinyl acetate, having a melt index within the range of approximately 10 to 50 and a pellet to powder mixture ratio within the range by weight of approximately 50% to 80% pellets and approximately 50% to 20% powder, and introducing a predetermined amount of the mixture into said mold, said process resulting in the production of a hollow article having predetermined bounce characteristics which are not dependent on internal pressure within the article, and which are maintained for unlimited time and irrespective of puncturing of the article wall.

11. The process of claim 10 wherein predetermined amounts of the pellets and powders are metered out by separate metering dispensers, after which the streams of pellets and powders are merged together before or just as they enter the mold.

12. The process of claim 10 wherein the mold is openable and comprises a lower half, and wherein the lower half of the mold cavity is filled within the range of ⅔ full to completely full of the pellet-powder mixture.

13. A process in accordance with claim 10 wherein said mold is heated in an oven maintained at a temperature within the range of approximately 500° F. to 625° F. for a predetermined time sufficient to cause the pellets and powder to melt and blend together to form a uniform homogeneous layer against the interior wall of the mold cavity, and is then subsequently cooled during said rotation until the mold can be opened and the article can be removed without deformation.

14. A process in accordance with claim 13 wherein the rotation of said mold is continuous during said heating and cooling thereof.

15. A process in accordance with claim 10 wherein the pellet to powder ratio is approximately 60% to 80% pellets and approximately 40% to 20% powder.

16. A process in accordance with claim 10 wherein a silvery or colored metallic flake material is mixed with the powder prior to charging into the mold.

17. A process in accordance with claim 10 wherein the article produced is a tennis ball having bounce characteristics generally equivalent to those possessed by (a) hollow balls with non-cellular walls made from other thermoplastics, (b) hollow balls with non-cellular walls made from rubber-like compositions of natural and/or synthetic polymers, and/or (c) solid cellular balls made from other thermoplastics or rubber-like compositions of natural and/or synthetic polymers.

18. A process in accordance with claim 10 wherein the article produced is a handball for use in the handball game, with the ball having bounce characteristics generally equivalent to those possessed by (a) hollow balls with non-cellular walls made from other thermoplastics, (b) hollow balls with non-cellular walls made from rubber-like compositions of natural and/or synthetic polymers, and/or (c) solid cellular balls made from other thermoplastics or rubber-like compositions of natural and/or synthetic polymers.

19. A process in accordance with claim 10 wherein said article produced is a racket ball having bounce characteristics generally equivalent to those possessed by (a) hollow balls with non-cellular walls made from other thermoplastics, (b) hollow balls with non-cellular walls made from rubber-like compositions of natural and/or synthetic polymers, and/or (c) solid cellular balls made from other thermoplastics or rubber-like compositions of natural and/or synthetic polymers.

20. A process in accordance with claim 10 wherein the article produced is punctured with a pin, needle or knife to relieve any internal vacuum, without detracting from the bounce characteristics.

21. A process in accordance with claim 10 wherein the pellet to powder mixture ratio is such that the amount of powder is just substantially sufficient to fill all of the voids between the pellets, resulting in a volume of pellet and powder mixture which is substantially the same as the volume of the pellets prior to adding the powder.

22. A process in accordance with claim 10 wherein the article produced is a ball for use as a child's toy with the ball having bounce characteristics generally equivalent to those possessed by (a) hollow balls with non-cellular walls made from other thermoplastics, (b) hollow balls with non-cellular walls made from rubber-like compositions of natural and/or synthetic polymers, and/or (c) solid cellular balls made from other thermoplastics or rubber-like compositions of natural and/or synthetic polymers.

* * * * *